United States Patent [19]
Chamberlain

[11] 3,863,443

[45] Feb. 4, 1975

[54] HIGH PRESSURE ROCKET AND COOLING MEANS

[75] Inventor: John Chamberlain, North Palm Beach, Fla.

[73] Assignee: United Aircraft Corporation, East Hartford, Conn.

[22] Filed: Oct. 25, 1963

[21] Appl. No.: 319,047

[52] U.S. Cl. .................................. 60/265, 60/260
[51] Int. Cl. ...................................................... F02k
[58] Field of Search ................ 60/35.6, 39.65, 39.66

[56] References Cited
UNITED STATES PATENTS
3,305,178  2/1967  Parilla ............................ 239/265.11
FOREIGN PATENTS OR APPLICATIONS
750,901  10/1950  Great Britain ......................... 60/260

*Primary Examiner*—Samuel Feinberg
*Attorney, Agent, or Firm*—Jack N. McCarthy

EXEMPLARY CLAIM

1. In an engine having a combustion chamber of circular cross-section and concentric about an axis and including a propellant injector head at the upstream end of the combustion chamber and an exhaust nozzle at the downstream end of the combustion chamber, and wherein the combustion chamber is made up of a plurality of coaxially, circumferentially extending, abutting, flat rings, the improvement wherein each of said rings includes an outer diameter surface and an inner diameter surface and a first face surface having a circumferentially extending groove therein and further having a second groove extending between and in communication with said outer diameter surface and said circumferentially extending groove, and said first face surface still further having a plurality of arcuate grooves extending between and in communication with said circumferentially extending groove and said inner diameter surface, each of said rings further having a second face surface having a plurality of arcuate grooves extending between said inner diameter surface and the region in axial alignment with said circumferentially extending groove.

29 Claims, 14 Drawing Figures

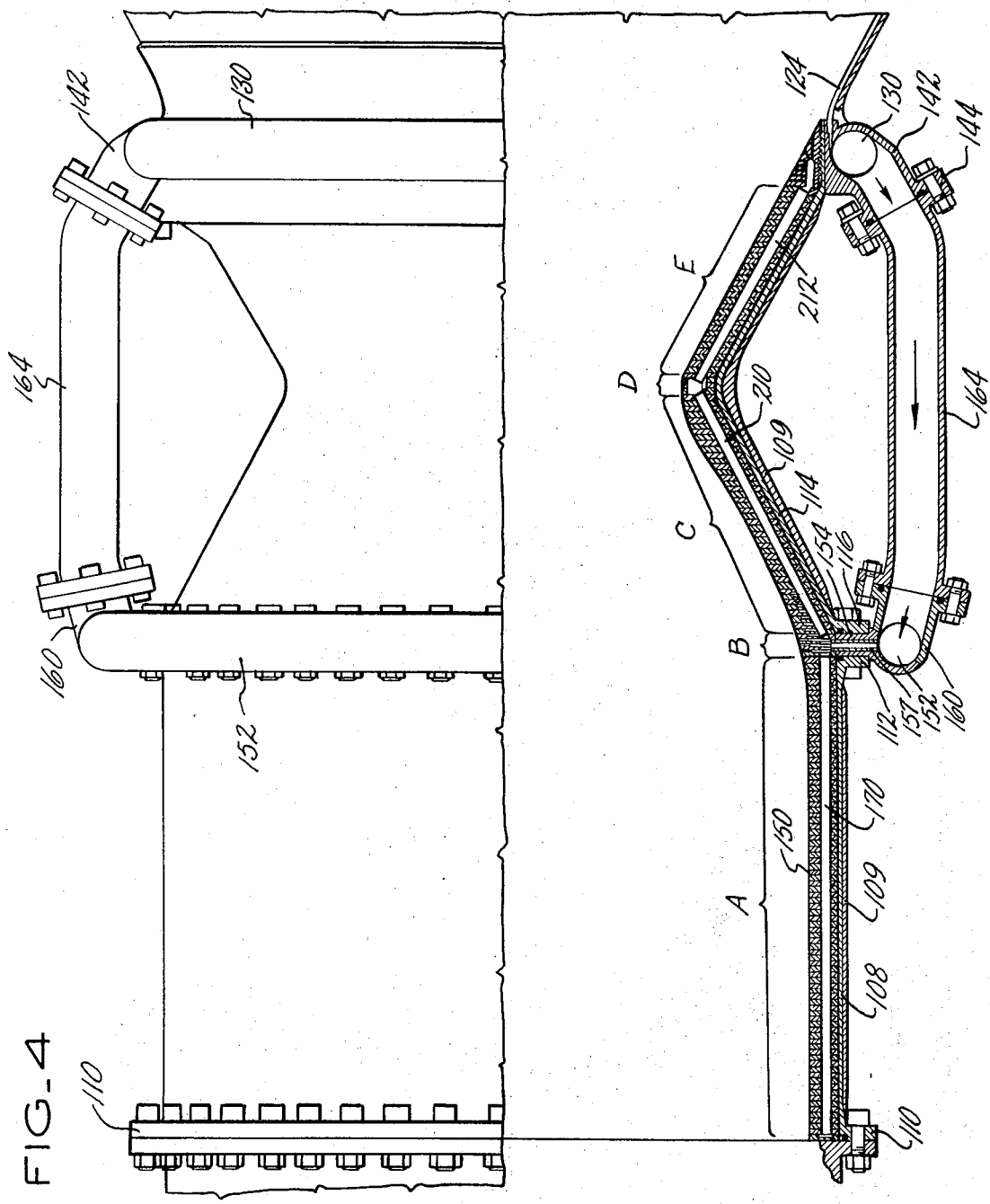

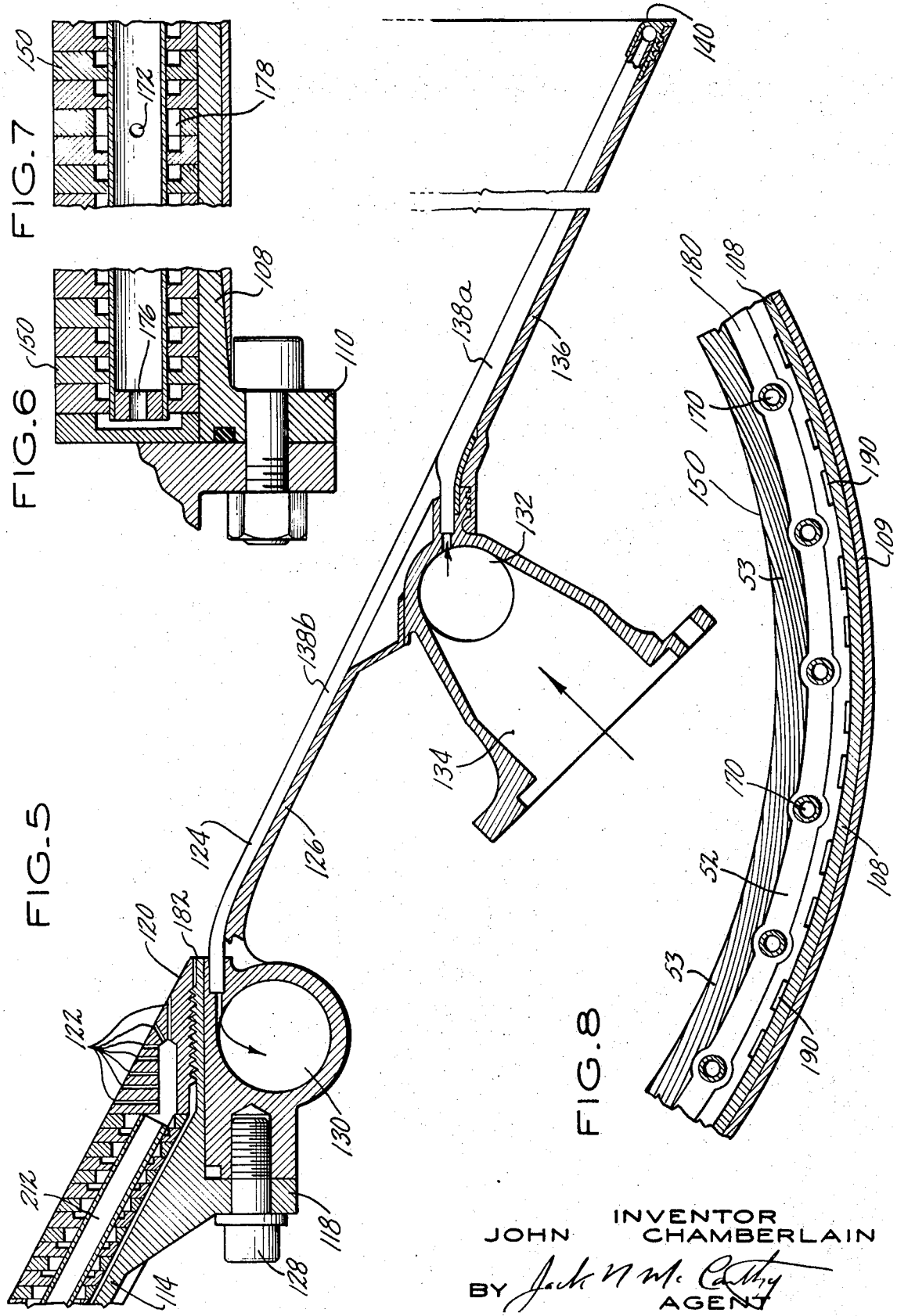

HIGH PRESSURE ROCKET AND COOLING MEANS

This invention relates to means for cooling passageways for directing hot gases therethrough and more particularly for the cooling of rocket thrust chambers and nozzles containing high pressures.

An objective of this invention is to provide a thrust chamber, nozzle, or duct means formed from a series of stacked wafers, with each wafer having grooves.

Another object of this invention is to provide means for varying the effect of cooling throughout the length of a chamber, nozzle, or duct means transferring a hot flow of gas.

A further object of this invention is to provide a cooling means which will effectively cool a chamber nozzle or duct means when the pressure of the hot flow of gas is at a high pressure level. When considering rocket engines, conventional regenerative cooling is limited to roughly 1,800 PSIA with oxygen-hydrogen propellants, this cooling means will extend well above this limit.

Another object of this invention is to provide cooling means which, in addition to providing efficient cooling at high pressures, is easily fabricated, is fully capable of being inspected and is structurally formed to operate in the pressure ranges for which it is intended.

A further object of this invention is to provide a cooling wafer having grooves on each side having a very large length/diameter ratio.

Another object of this invention is to provide that the sides of adjacent wafers have their grooves each extending in the opposite direction so that the grooves from one wafer cross over the grooves of the adjacent wafer.

A further object of this invention is to provide separately metered coolant flow to the wafers, according to the predicted cooling requirements of each.

Another object of this invention is to provide cooling means which will internally cool the wall of the chamber, nozzle or duct and will also provide film cooling of the hot gas passageway by the discharged coolant.

A further object of this invention is to provide means for directing the flow of coolant entering the thrust chamber, nozzle, or duct means in a direction downstream of the gas flow therein.

Another object of this invention is to provide means for reducing combustion instability.

Other objects and advantages will be apparent from the specification and claims and from the accompanying drawings which illustrate the invention.

FIG. 4 is a view of a modification of a rocket chamber and nozzle showing the chamber and throat section formed by wafers.

FIG. 5 is an enlarged view showing the connection of the wafer portion of the nozzle connected to a regenerative cooled section.

FIG. 6 is an enlarged fragmentary view showing the end of the wafers which are adjacent the injection head.

FIG. 7 is an enlarged fragmentary view showing the construction where a metering orifice opens into the coolant distributing manifold of the wafers.

FIG. 8 is a partial sectional view taken through the chamber portion of the rocket.

Figure 1:
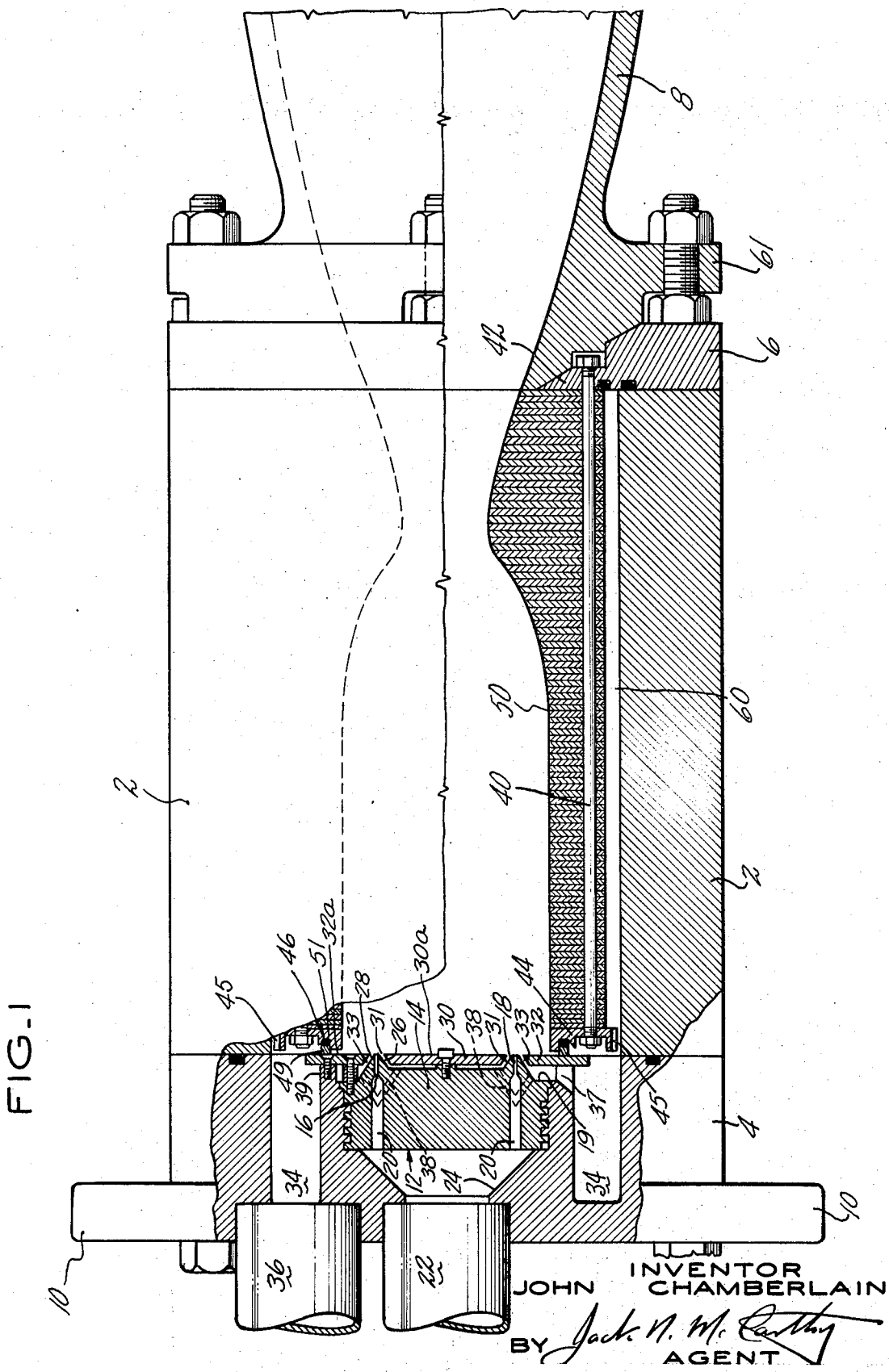
FIG. 1 is a view of a rocket nozzle and injection head, partially in section showing the chamber and throat section formed by wafers.

Referring first to FIG. 1, the rocket has a substantially cylindrical outer wall 2, an end closure member 4, a wafer retaining ring 6, and a nozzle skirt 8. While these elements have been shown bolted together, they can be fixed by other satisfactory means. The end closure member 4 has a flange 10 for attaching it to a vehicle or other body. The center of the inner side of the end closure member 4 is recessed so as to receive an injector head 12. The head is positioned by having a member 14 threadably secured in the recess of the end closure. An annular projection 16 is formed extending from the inner face of the member 14. This projection has an annular slot 18 cut therein. Passageways 20 extend from the outer side of the member 14 to the bottom of the slot at a number of positions. An oxidizer supply is directed to the passageways 20 through a conduit 22 and passageway 24 located in the closure member 4.

The annular projection 16 is formed having an inner sloping side 26 extending away from the slot forming the sides of a recessed center and an outer sloping side 28 extending away from the slot forming the side intersecting annular face 19. A porous plate 30 is fixedly positioned in the recessed center of the annular projection 16 so that the end 31 of the plate 30 parallels the inner sloping side 26 of the annular projection 16. The side of the plate 30 adjacent the member 14 is fixedly spaced therefrom a distance approximately equal to the space between the end of the plate and the annular projection 16. Spacer members can be placed between the plate 30 and the recessed center, or abutments can extend from either the plate or center as shown.

An annular porous plate 32 is fixedly positioned around the annular projection 16 so that the inner peripheral end 33 of the annular plate 32 parallels the outer sloping side 28 of the annular projection 16. The annular plate 32 is fixedly secured to the closure member 14 and spaced therefrom by spacers. Plate 32 is also fixed to projections 39 of the member 4 which form openings 37 therebetween which serve as passages to be hereinafter described.

The inwardly facing surface 30a of the porous plate 30, the opening of the annular slot 18 on the inner face of the member 14 and the inwardly facing surface 32a of the annular plate 32, all lie in a plane with the end of closure member 4 which abuts the cylindrical wall 2. An annular chamber 34 in the closure member 4 is connected to the space between the annular plate 32 and member 14 by the openings 37 referred to above. Passageways 38 connect the space between plate 30 and member 14 to the space between the annular plate 32 and member 14. A hydrogen supply is directed to the annular chamber 34 through conduit 36. It is then delivered to the space between the annular plate 32 and the member 14 through openings 37 which extend around the closure member 4, and in turn, to the space between the plate 30 and member 14 through passageways 38. The porous material of the face of the injector head provides for cooling thereof.

It can be seen that two annular rings of hydrogen will flow from the face of the injector head and have projected angular paths which will meet at a line spaced outwardly from the slot 18.

The wafer retaining ring 6 has a plurality of wafers 50 affixed thereto to be positioned within the cylindrical wall 2. Each wafer is constructed annular in shape, each having the same outer diameter. The inner peripheries of the wafers are arranged to provide the desired contour through the area to be built up by the wafers. These wafers all have several openings around their outer edges which receive through-bolts 40. These bolts extend through an inwardly projecting flange 42 on the wafer retaining ring 6. The group of wafers 50 has an end annular ring 44 receiving sealing means 46 which abuts the outer face of the injector head 14 at plate 32. Sealing means 46 consists of a metallic ring 49 and a resilient ring 51. The resilient ring 51 is compressed between the ring 49 and the ring 44. The outer periphery of the annular ring 44 is scalloped at 45 to permit the hydrogen in the annular chamber 34 to pass thereby and enter the chamber 60 formed by the inner surface of the cylindrical wall 2 and the outer periphery of the wafers 50.

Figure 2:
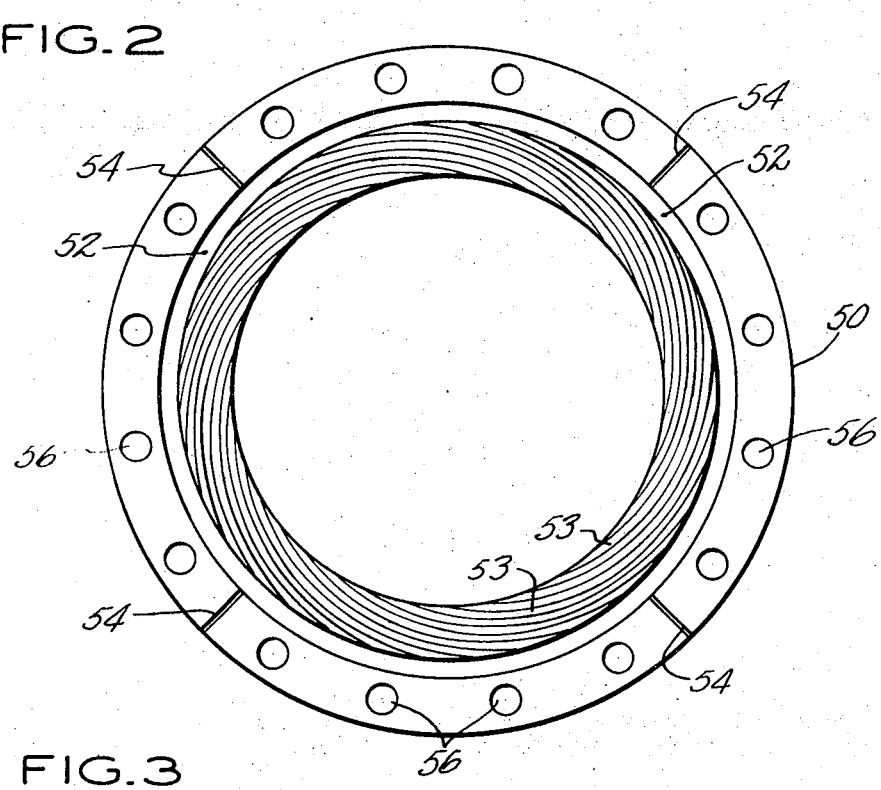
FIG. 2 is a view of one side of a wafer used in the construction of the chamber and throat of FIG. 1.
Figure 3:
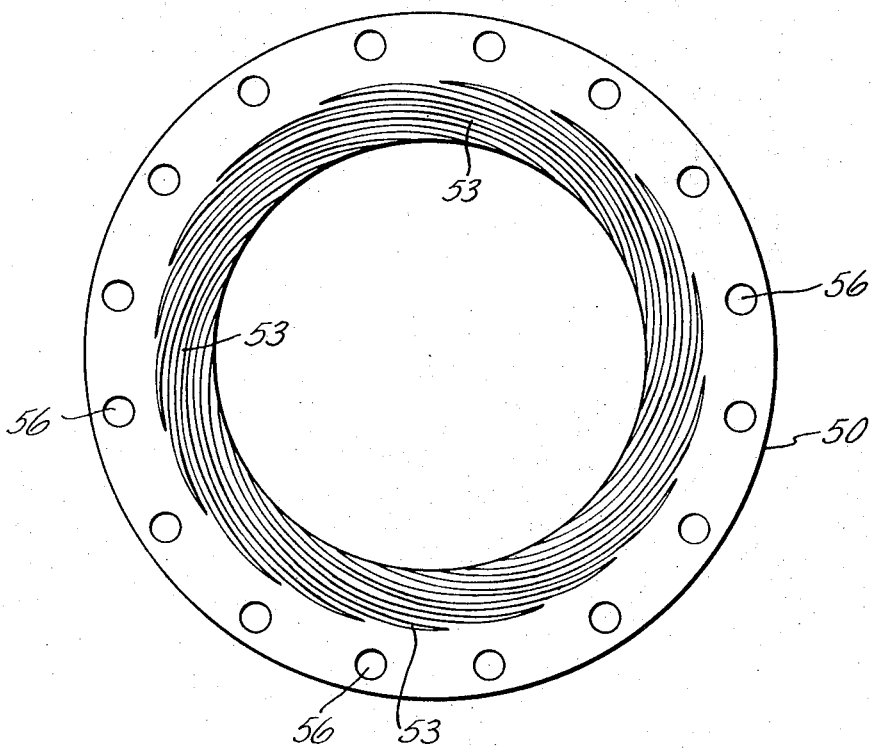
FIG. 3 is a view of the other side of the wafer shown in FIG. 2.

One side of wafer 50 is formed having an annular manifold groove 52 (see FIG. 2). Grooves 53 are formed extending between the annular groove 52 and the inner periphery of the wafer. These grooves are formed as portions of involute curves so that grooves can be obtained which will extend an equal distance through the wafer and have a large length/diameter ratio. They appear in FIGS. 2 and 3 to be substantially arcuate. Four metering passageways 54 extend between the groove 52 and the outer periphery of each wafer. Grooves 53 are also formed on the other side of said wafer and extend in from the inner periphery a distance placing their inner ends at a line so as to contact the groove 52 of the adjacent plate. The involute grooves are formed on adjacent faces of adjacent wafers so as to form a criss-cross groove pattern when placed together. That is, the grooves on one face curve outwardly in a clockwise direction while the grooves on the mating face curve outwardly in a counter-clockwise direction. Holes 56 appear in the wafers between the groove 52 and the outer periphery to receive the through-bolts 40.

The nozzle skirt 8 in FIG. 1, while shown uncooled, can be cooled by any means desired if necessary. Some known cooling means are ablative cooling and regenerative cooling.

While the wafers 50 and 150 are shown flat they may be made of other mating contours such as frusto-conical.

As stated hereinbefore, when the wafers 50 are assembled with the through-bolts 40 holding them together between the annular ring 44 and the flange 42 of the wafer retaining ring 6, the inner peripheries of the wafers define a combustion chamber and the throat portion of the nozzle. While the wafers are shown extending for the length of the combustion chamber and throat portion of the nozzle, it is to be understood that they can be used for any section needing this type of cooling. When the rocket is started, the hydrogen and the oxidizer are injected through the injector head 14 to the interior of the chamber and are ignited therein. The supply of hydrogen also flows to the chamber 60 and the flow is metered therefrom through the metering passageways 54. The metering passageways are arranged in accordance with the desired flow of coolant at that point along the length of the chamber and nozzle formed by the wafers. If a large flow is desired, the metering passageways 54 can be made larger or a larger number of them can be used. If a lesser flow is required, smaller passageways 54 can be used or a fewer number.

After the coolant, in this case, hydrogen, has been metered by passageways 54 to its respective groove 52 in a specific wafer 50, the coolant then passes through the involute or arcuate grooves of a pair of adjacent wafers which extend from groove 52 to the inner periphery of the wafers which form the wall of the combustion chamber and nozzle throat. The coolant thus cools the wafers as it passes through. When it emerges, it dilutes the main combustion gas at the wall, thus providing a film cooling effect in addition to the internal cooling of the wafer. The wafers are made of a high-conductive material so that the heat will be conducted from the wall to the groove. Copper has been found to be satisfactory in this regard. It will be noted that the flow cooling the back of a wafer is provided by a different set of orifices than those which provide the coolant to the front.

To provide efficient groove heat transfer, the groove must have a very large length/diameter ratio. By use of the involute pattern, long grooves can be provided within a small wafer width.

As stated hereinbefore, the grooves 53 of mating faces of adjacent wafers extend in the opposite sense so that the grooves from one wafer cross over the grooves of the next wafer. This crossing of grooves provides three important advantages:

1. heat transfer is greatly improved by added turbulance,
2. plugging at a spot along one of the grooves has little effect, and
3. it is not necessary to align grooves on one wafer with those on the next wafer.

The nozzle skirt 8 is fixed to the wafer supporting ring 6 by flange 42. The inner surface of the skirt continues from the inner periphery of the last wafer of the stack.

Using the cooling system just described, chamber firings of a rocket were made and the pressures recorded therein at four of the firing runs were 2,625 PSIA, 2,850 PSIA, 3,140–3,145 PSIA and 2,975–2,955 PSIA. These runs were satisfactory and the coolant used was hydrogen. The wafers were made of copper and the grooves followed an involute curve.

Referring to FIG. 4, the modified chamber and nozzle is shown having the chamber section, convergent throat section and divergent throat section formed using wafers 150 while the remainder of the nozzle 124 is formed having conventional regenerative cooling.

This type of cooling is shown in U.S. Pat. No. 3,086,358. The open end of the chamber is attached to a vehicle or other body so that an injector head opens into the chamber. For example, it could bolt to a member 4 as shown in FIG. 1. The wafers which form the chamber and nozzle throat sections are similar to the wafers shown in FIGS. 2 and 3 and have the same groove pattern (see FIG. 8)

The wafers A form generally the interior of the chamber having their outer peripheries forming generally a cylinder and are contained within a structural metallic casing 108 having flanges 110 and 112 on its forward and rearward ends, respectively. The wafers B are formed to provide a distribution manifold at this point to be hereinafter described. The wafers C are positioned within the convergent section of an outer structural metallic casing 114 with their outer peripheries against the casing. The wafers D form another distribution manifold and wafers E form a divergent section which is placed within the metallic casing 114 and the outer periphery of these wafers are against the casing. Metallic casing 114 has flanges 116 and 118 on its forward and rearward ends, respectively. The casings 108 and 114 have pre-stressed filament wound Fiberglas 109 covering them between their end flanges.

As shown in FIG. 5, an annular nut 120 is threadably secured within the rearward end of the casing 114 and retains the wafers 150 in place. This annular nut contains a multiplicity of passages 122 which permits the coolant flow to extend therethrough into the nozzle at this point.

The remainder 124 of the nozzle extends from the rearward end of casing 114 as a regenerative type. The portion 124 of the nozzle is formed having a casing portion 126 continuing as a divergent section and bolted to the rearward flange 118 of casing 114 by a plurality of bolts 128. A manifold 130 is formed with the casing portion 126 at this point. Another manifold section 132 is connected to the rearward end of the casing section 126 and has a conduit 134 connected therewith for directing a flow of coolant thereto. Another divergent casing section 136 is fixed to and extends from this manifold 132 to its rearward opening. The casing section 126, manifold 132 and casing section 136 are positioned so that the plurality of cooling tubes 138 fixed to the inner surface of these sections will form the interior of the remainder 124 of the nozzle.

These tubes are made up of a section 138a which has one end communicating with the interior of the manifold 132 and which extends outwardly to the end of the casing section 136 where it is held by a bracket 140. At the bracket 140, the tube bends and has a returning section 138b which is connected to the interior of the manifold 130. It can be seen that the coolant entering the manifold 132 will pass through the multiplicity of cooling tube sections 138a and pass therethrough to the tube sections 138b which in turn direct the coolant into the manifold 130.

Figure 9:
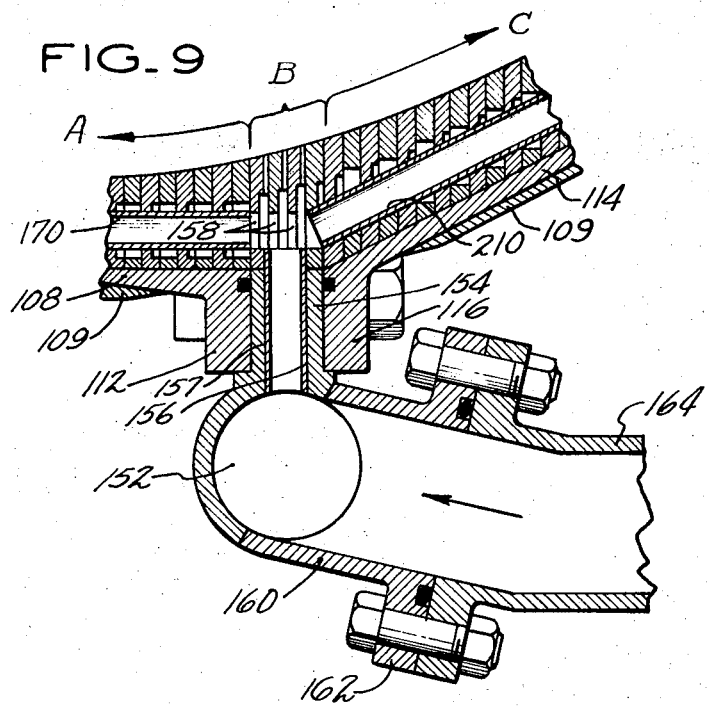
FIG. 9 is an enlarged fragmentary view showing the construction where the coolant enters the wafers to be distributed throughout.
Figure 10:
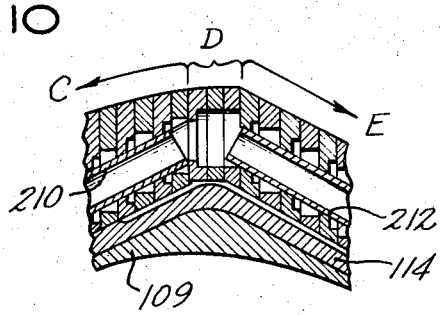
FIG. 10 is an enlarged fragmentary view showing the construction where the convergent section extends into the divergent section.

The manifold 130 has two conduits 142 (FIG. 4) extending therefrom for a purpose to be hereinafter described. Each of these conduits 142 has a flange 144 at its free end. As also viewed in FIG. 9, a manifold 152 is formed on an annular plate 154. This annular plate 154 is adapted to be held between the flange 112 of the casing 108 and the flange 116 of the casing 114. The width of this flange 154 corresponds to the width of the wafers B. A plurality of passageways 156 extends radially through the flange 154 between the manifold 152 and the inner periphery of the plate. A tube 157 fits within each passageway 156 and extends to the annular grooves 52 of the cooperating wafers. The annular grooves 52 in the four wafers B are connected by a plurality of holes 158 so that an effective coolant distributing manifold will be formed at this point.

The manifold 152 has two conduits 160 extending therefrom, each having a flange 162 on its open end. Each of flanges 144 of the conduits 142 is connected to a cooperating flange 162 of one of the two conduits 160 by a pipe section 164. It can be seen that the coolant from the manifold 130 passes through the conduits 142, pipe sections 164 and conduits 160 into the manifold 152. The coolant from the manifold 152 is directed to the stack of wafers 150 through the plurality of tubes 157. From the tubes 157, the coolant passes into the annular grooves 52 of the cooperating wafers and flows through the group of wafers B substantially as a coolant distributing manifold.

From this point, the coolant passes forwardly through a plurality of tubes 170 which extend to the first wafer adjacent the flange 110. The number of these tubes depends on the coolant flow desired and, as shown in FIGS. 6 and 7, the tubes meter coolant to the wafers 150 by metering orifices. If an orifice is made along the length of the tube, it is formed as a hole 172 in the side of the tube, and if one is formed by an end of a tube, it is made as a plug 174 having a hole 176 therein. The tubes may all be of the same length, or may vary in length, with the end being positioned where the last metering hole is needed in the tube. If a large number of tubes are used, each tube can feed different wafers as desired. For example, if there were twenty tubes around the chamber position and forty wafers, each tube could have one metering hole located at a different location along its length to take care of each successive set of two wafers. If there were ten tubes and 40 wafers, two metering holes could be located at different locations along each tube to serve each pair of wafers. Here again, the holes are sized to obtain desired flow at a particular location along the chamber or throat section.

Where a hole 172 is placed to meter, a through hole 178 is formed in one of two adjacent wafers so that the hole 172 will not be blocked by a portion of the wafer slidable thereon. As shown in FIG. 8, the annular grooves 180 of the wafers are enlarged where the tube passes therethrough so as to permit coolant to pass therearound and form a complete annulus. The outer periphery of the wafers have axial grooves 190 therein which are axially aligned along the length to form a plurality of through venting passageways. These passageways extend the full length of the wafers and exhaust between the retaining nut 120 and the end of the casing 114 at 182.

From the group of wafers B, the coolant also passes rearwardly through a plurality of tubes 210. A group of wafers D is formed at the converging-diverging point and provides a flow connection between the rearward end of tubes 210 and the forward end of tubes 212. Tubes 212 carry the coolant to the wafers 150 in the divergent section and to the passageways 122 in the nut 120.

Figure 11:
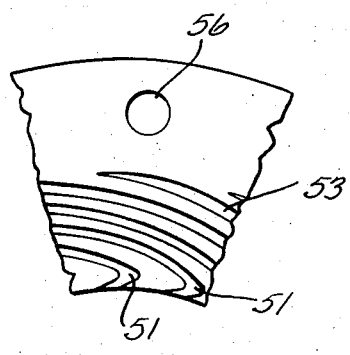
FIG. 11 is an enlarged fragmentary view of a modified wafer.

With reference to FIG. 11, the grooves 53 on one side of the wafers are shown turned at 51 so that the grooves become parallel to the mating grooves on the adjacent wafer. This provides injection of all of the coolant in one direction.

Figure 12:
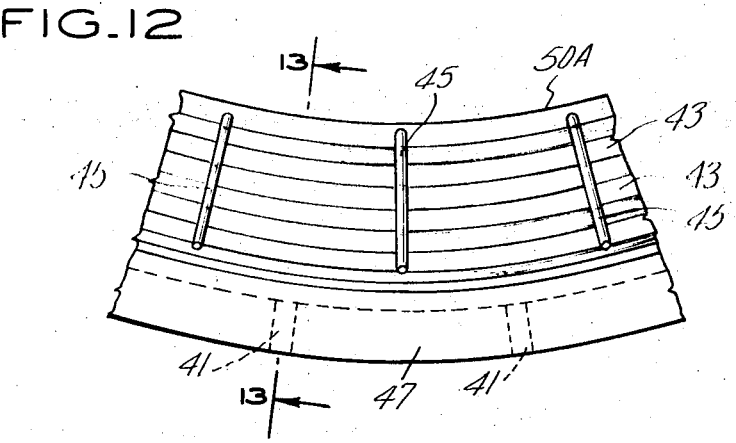
FIG. 12 is a fragmentary view showing one side of a modified wafer.
Figure 13:
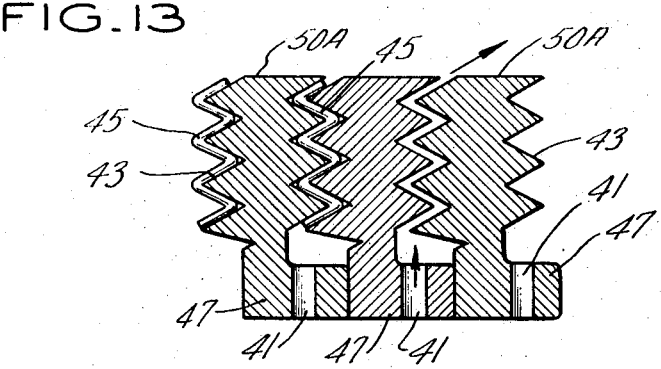
FIG. 13 is a fragmentary view taken along the line 13—13 of FIG. 12.

FIGS. 12 and 13 show a modified form of wafer 50A which has each face of the wafer formed as a series of annular V grooves 43. The grooves on the sides of the adjacent faces of adjacent wafers 50A are arranged so that the projecting portions between the grooves on one side extend into the grooves on the mating side of the adjacent wafers. This provides a long zig-zag passage with annular openings on the interior of the chamber, throat section or duct. The grooves 43 are so arranged so as to have the fluid leaving in a downstream direction. The holes 41 can be used to meter a flow of coolant to the passages. Wires 45 are used to separate the outer disc portion and the root sections 47 are arranged so that they abut one another. Other separating means can be used.

Figure 14:
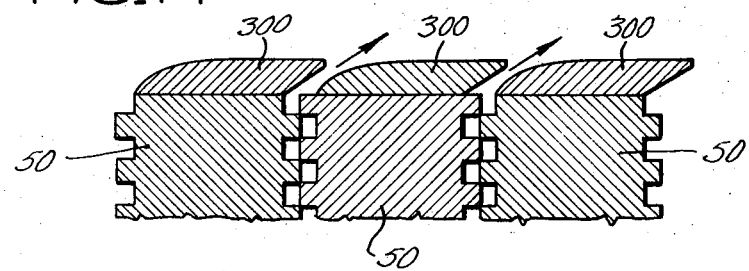
FIG. 14 is an enlarged fragmentary view of the inner periphery of wafers showing the positioning of a louver ring for directing flow.

FIG. 14 shows the inner edge of three wafers 50 with the crossing grooves being shown wherever they may fall. A ring 300 is fixed to the interior periphery of each wafer and has a rounded front portion and a projecting rear portion which extends a distance greater than the depth of both sets of involute or arcuate grooves which are immediately downstream of the ring. This deflects the coolant flow in a downstream direction. This ring could be a nickel ring shrink-fitted to the copper wafer and diffusion bonded to the copper.

It is to be understood that the invention is not limited to the specific description above or other specific figures, but may be used in other ways without departure from its spirit as defined by the following claims.

I claim:

1. In an engine having a combustion chamber of circular cross-section and concentric about an axis and including a propellant injector head at the upstream end of the combustion chamber and an exhaust nozzle at the downstream end of the combustion chamber, and wherein the combustion chamber is made up of a plurality of coaxially, circumferentially extending, abutting, flat rings, the improvement wherein each of said rings includes an outer diameter surface and an inner diameter surface and a first face surface having a circumferentially extending groove therein and further having a second groove extending between and in communication with said outer diameter surface and said circumferentially extending groove, and said first face surface still further having a plurality of arcuate grooves extending between and in communication with said circumferentially extending groove and said inner diameter surface, each of said rings further having a second face surface having a plurality of arcuate grooves extending between said inner diameter surface and the region in axial alignment with said circumferentially extending groove.

2. Apparatus as in claim 1 wherein the arcuate grooves in said first face surface of said ring extend in the opposite direction to the arcuate grooves in said second face surface of said ring.

3. Apparatus as in claim 1 and including a ring insert attached to said inner diameter surface of each of said rings and with each of said inserts including a rearwardly projecting lip at its downstream end and having a forwardly extending taper at its upstream end so that said lip and said taper of adjacent rings cooperate to form a rearwardly extending passage therebetween.

4. Apparatus according to claim 2 wherein the arcuate grooves in one of said face surfaces extend in one direction for a portion of the distance between said circumferential groove and said inner diameter surface and in the opposite direction for the remainder of the distance between said circumferential groove and said inner diameter surface, and wherein said opposite direction is the direction of said arcuate grooves in the other of said face surface.

5. In an engine having a chamber formed from a plurality of wafers axially stacked together, each wafer being formed as annular in shape, one side of said wafer having an annular groove extending around its face, a plurality of first arcuate grooves having a high L/D ratio extending from said annular groove to the inner periphery of the wafer, a plurality of second grooves having a high L/D ratio on the opposite side of said wafer covering approximately the same area as the first arcuate grooves on the other side, and means for metering a coolant to said annular grooves.

6. In an engine having a chamber formed from a plurality of wafers axially stacked together, each wafer being formed as annular in shape, one side of said wafer having an annular groove extending around its face, a plurality of first involute grooves having a high L/D ratio extending from said annular groove to the inner periphery of the wafer, a plurality of second grooves having a high L/D ratio on the opposite side of said wafer covering approximately the same area as the first involute grooves on the other side, and means for metering a coolant to said annular grooves.

7. In an engine having a chamber formed from a plurality of wafers axially stacked together, each wafer being formed as annular in shape, one side of said wafer having an annular groove extending around its face, a plurality of first arcuate grooves having a high L/D ratio extending from said annular groove to the inner periphery of the wafer, a plurality of second arcuate grooves having a high L/D ratio on the opposite side of said wafer covering approximately the same area as the first arcuate grooves on the other side, and a metering orifice extending from the outer periphery of each wafer to its annular groove.

8. In an engine having a chamber formed from a plurality of wafers axially stacked together, each wafer being formed as annular in shape, one side of said wafer having an annular groove extending around its face, a plurality of first involute grooves extending from said annular groove to the inner periphery of the wafer, a plurality of second involute grooves on the opposite side of said wafer covering approximately the same area as the first involute grooves on the other side, and a metering orifice extending from the outer periphery of each wafer to its annular groove.

9. In an engine having a chamber formed from a plurality of wafers axially stacked together, each wafer being formed as annular in shape, one side of said wafer having an annular groove extending around its face, a plurality of first grooves having a high L/D ratio extending from said annular groove to the inner periphery of the wafer, a plurality of second grooves having a high L/D ratio on the opposite side of said wafer covering approximately the same area as the first grooves on the other side, and a plurality of tubes extending through the outer edge of said wafers, said tubes having orifices connected to said annular grooves for metering a coolant thereto.

10. In an engine having a chamber formed from a plurality of wafers axially stacked together, a casing around the outer periphery of said wafers, each wafer being formed as annular in shape, one side of said wafer having an annular groove extending around its face, a plurality of first grooves having a high L/D ratio extending from said annular groove to the inner periphery of the wafer, a plurality of second grooves having a high L/D ratio on the opposite side of said wafer covering approximately the same area as the first grooves on the other side, and means for metering a coolant to said annular grooves, and a vent passage for venting the outer periphery of said wafers to a pressure lower than that in the chamber.

11. In an engine having a chamber formed from a plurality of wafers axially stacked together, each wafer being formed as annular in shape, one side of said wafer having an annular groove extending around its face, a plurality of first arcuate grooves having a high L/D ratio extending from said annular groove to the inner periphery of the wafer, a plurality of second arcuate grooves having a high L/D ratio on the opposite side of said wafer covering approximately the same area as the first arcuate grooves on the other side, and means for metering a coolant to said annular grooves, the arcuate grooves of the mating faces of adjacent wafers extending in opposite directions forming a criss-cross pattern.

12. In an engine having a chamber formed from a plurality of wafers axially stacked together, each wafer being formed as annular in shape, one side of said wafer having an annular groove extending around its face, a plurality of first arcuate grooves having a high L/D ratio extending from said annular groove to the inner periphery of the wafer, a plurality of second arcuate grooves having a high L/D ratio on the opposite side of said wafer covering approximately the same area as the first arcuate grooves on the other side, and means for metering a coolant to said annular grooves, the arcuate grooves of the mating faces of adjacent wafers extending in opposite directions forming a criss-cross pattern, one set of mating arcuate grooves of each two mating sets having the grooves turn at the inner periphery of the wafer to parallel the grooves of the other set.

13. In an engine having a chamber formed from a plurality of wafers axially stacked together, each wafer being formed as annular in shape, one side of said wafer having an annular groove extending around its face, a plurality of first grooves having a high L/D ratio extending from said annular grove to the inner periphery of the wafer, a plurality of second grooves having a high L/D ratio on the opposite side of said wafer covering approximately the same area as the first grooves on the other side, means for metering a coolant to said annular grooves, and a ring fixed to the inner periphery of a plurality of wafers having a rearward extension extending over its downstream groove outlets and the groove outlets of the adjacent wafer to provide a downstream deflector.

14. In an engine having a chamber formed from a plurality of wafers axially stacked together, each wafer being formed as annular in shape, one side of said wafer having an annular groove extending around its face, a plurality of first annular V grooves extending from said annular groove to the inner periphery of the wafer, a plurality of second annular V grooves on the opposite side of said wafer covering approximately the same area as the first grooves on the other side, said V grooves of mating faces of adjacent wafers engaging to form an outwardly extending zig-zag passage, means for spacing said wafers, and means for metering a coolant to said annular grooves.

15. In an engine having a chamber formed from a plurality of wafers axialy stacked together, each wafer being formed as annular in shape, one side of said wafer having an annular groove extending around its face, a plurality of first arcuate grooves having a high L/D ratio extending from said annular groove to the inner periphery of the wafer, a plurality of second arcuate grooves having a high L/D ration on the opposite side of said wafer covering approximately the same area as the first grooves on the other side, and means for directing a coolant to said annular grooves, the arcuate grooves of adjacent faces of adjacent wafers forming a criss-cross pattern, the ends of the grooves of one face having a turn at the end of the inner periphery of the wafer to parallel the end of the mating grooves.

16. In an engine having a chambered and nozzle portion formed from a plurality of wafers axially stacked together, each wafer being formed as annular in shape, the inner peripherys of the wafer being sized to form the inner contour of the chamber and nozzle section, one side of said wafer having an annular groove extending around its face, a plurality of first grooves having a high L/D ratio extending from said annular groove to the inner periphery of the wafer, a plurality of second grooves having a high L/D ratio on the opposite side of said wafer covering approximately the same area as the first grooves on the other side, and a plurality of tubes extending through the outer edge of said wafers, said tubes having orifices connected to said annular grooves for metering a coolant thereto, the orifices being of varying sizes to control the flow of coolant to the interior of the chamber and nozzle portion to obtain the desired cooling.

17. In an engine having a chamber formed from a plurality of wafers axially stacked together, a casing around the outer periphery of said wafers, each wafer being formed as annular in shape, one side of said wafer having an annular groove extending around its face, a plurality of first grooves having a high L/D ratio extending from said annular groove to the inner periphery of the wafer, a plurality of second grooves having a high L/D ratio on the opposite side of said wafer covering approximately the same area as the first grooves on the other side, and means for metering a coolant to said annular grooves, and an axial passage along the outer periphery of the wafers inside the casing for venting the outer periphery of said wafers to a pressure lower than that in the chamber.

18. In an engine having a chamber formed from a plurality of wafers axially stacked together, each wafer being formed as annular in shape, one side of said wafer having an annular groove extending around its face, a plurality of grooves having a high L/D ratio extending from said annular groove to the inner periphery of the wafer, and a plurality of tubes extending through the outer edge of said wafers, said tubes having orifices connected to said annular grooves for metering a coolant thereto.

19. In an engine having a chamber and nozzle portion formed from a plurality of wafers axially stacked together, each wafer being formed as annular in shape, the inner peripheries of the wafer being sized to form the inner contour of the chamber and nozzle section, one side of said wafer having an annular groove extending around its face, a plurality of first grooves having a high L/D ratio extending from said annular groove to the inner periphery of the wafer, and a plurality of tubes extending through the outer edge of said wafers, said tubes having orifices connected to said annular grooves for metering a coolant thereto, the orifices being of varying sizes to control the flow of coolant to the interior of the chamber and nozzle portion to obtain the desired cooling.

20. In an engine having an axis, a combustion chamber defined by a wall of generally circular cross-section and concentric about said axis, a propellant injector head at the upstream end of said combustion chamber and an exhaust nozzle at the downstream end of said combustion chamber, said combustion chamber comprising a plurality of flat rings juxtapositioned concentrically about said axis, each of said rings having an outer diameter surface, an inner diameter surface and opposite face surfaces, each of said rings further having a circumferentially extending groove in a first of said face surfaces and further having a second groove extending between said outer diameter surface and said circumferential groove and still further having a plurality of arcuate grooves extending between and communicating with said circumferential groove and said inner diameter surface, each of said rings further having a series of arcuate grooves on said opposite face surface extending between said inner diameter surface and the region of said opposite face surface in axial alignment with said circumferential groove, means to clamp said rings together such that said first face surface of each ring is in contact with said opposite face surface of the adjacent ring, and so that said ring inner diameter surfaces form said combustion chamber wall, means to pass fluid propellant to the outer diameter surfaces of said rings so that propellant will pass therefrom through said second grooves, then said circumferential grooves, then said arcuate grooves to said inner diameter surfaces and into said combustion chamber.

21. In an engine having an axis, a combustion chamber defined by a wall of generally circular cross-section and concentric about said axis, a propellant injector head at the upstream end of said combustion chamber and an exhaust nozzle at the downstream end of said combustion chamber, said combustion chamber comprising a plurality of flat rings juxtapositioned concentrically about said axis, each of said rings having an outer diameter surface, an inner diameter surface and opposite face surfaces, each of said rings further having a circumferentially extending groove in a first of said face surfaces and further having a second groove extending between said outer diameter surface and said circumferential groove and still further having a plurality of arcuate grooves extending between and communicating with said circumferential groove and said inner diameter surface, means to clamp said rings together such that said first face surface of each ring is in contact with said opposite face surface of the adjacent ring, and so that said ring inner diameter surfaces form said combustion chamber wall, means to pass fluid propellant to the outer diameter surfaces of said rings so that propellant will pass therefrom through said second grooves, then said circumferential grooves, then said arcuate grooves to said inner diameter surfaces and into said combustion chamber.

22. In an engine having a chamber formed from a plurality of wafers axially stacked together, each wafer being formed as annular in shape having an outer periphery and an inner periphery, a plurality of said wafers having grooves with a very large L/D ratio extending from the inner periphery of the wafer to a point adjacent the outer periphery, the grooves having their ends where they intersect the inner periphery of a wafer directed at an angle to the radius of the wafer to provide a swirl effect, and means for metering a coolant to said grooves adjacent the outer periphery of the wafer.

23. In an engine having a chamber formed from a plurality of wafers axially stacked together, each wafer being formed as annular in shape having an outer periphery and an inner periphery, a plurality of said wafers having grooves with a very large L/D ratio extending from the inner periphery of the wafer to a point adjacent the outer periphery, the grooves having their ends where they intersect the inner periphery of a wafer directed at an angle to the radius of the wafer to provide a swirl effect, said grooves having a length greater than the distance between the inner and outer peripheries, and means for metering a coolant to said grooves adjacent the outer periphery of the wafer.

24. In an engine having a combustion chamber of circular cross section and concentric about an axis and including a propellant injector head at the upstream end of the combustion chamber and an exhaust nozzle at thd downstream end of the combustion chamber, and wherein the combustion chamber is made up of a plurality of coaxially, peripherally extending, abutting, flat wafers, the improvement wherein each of said wafers includes an outer edge surface and an inner edge surface, a first abutting face surface on one side and a second abutting face surface on the other side of said wafer, one of said face surfaces having a plurality of arcuate grooves in communication at their inner ends with said inner edge surface, and means for metering a fluid to the outer ends of said arcuate grooves.

25. In an engine having a combustion chamber of circular cross section and concentric about an axis and including a propellant injector head at the upstream end of the combustion chamber and an exhaust nozzle at the downstream end of the combustion chamber, and wherein the combustion chamber is made up of a plurality of coaxially, peripherally extending, abutting, flat wafers, the improvement wherein each of said wafers includes an outer edge surface and an inner edge surface, a first abutting face surface on one side and a second abutting face surface on the other side of said wafer, one of said face surfaces having a plurality of involute grooves in communication at their inner ends with said inner edge surface, and means for metering a fluid to the outer ends of said involute grooves.

26. In an engine having a combustion chamber of circular cross section and concentric about an axis and including a propellant injector head at the upstream end of the combustion chamber and an exhaust nozzle at the downstream end of the combustion chamber, and wherein the combustion chamber is made up of a plurality of coaxially, peripherally extending, abutting, flat wafers, the improvement wherein each of said wafers includes an outer edge surface and an inner edge surface, a first abutting face surface on one side and a second abutting face surface on the other side of said wafer, one of said face surfaces having a plurality of arcuate grooves in communication at their inner ends with said inner edge surface in a substantially tangential direction to said combustion chamber, and means for metering a fluid to the outer ends of said arcuate grooves.

27. In a rocket engine having a combustion chamber and throat formed by a nozzle wall, that improvement which comprises:
  a. a multislotted nozzle wall, said wall being formed of a plurality of washers;
  b. said washers having a plurality of grooves formed on at least one face thereof whereby to form with an adjacent washer a plurality of passages;
  c. each of said washers further having a plurality of apertures therein aligned with apertures in adjacent washers whereby to form passages for passage of fluid through said washers, each of said grooves extending from the inner side of said nozzle wall and being constructed to at least one of said apertures, grooves on one washer being circumferentially offset relative to the grooves of an adjacent washer to evenly distribute said fluid around said nozzle wall;
  d. whereby fluid in said passages is adapted to pass through said grooves into said rocket engine to provide a cooling boundary layer.

28. In a rocket engine according to claim 27 wherein means are provided to bias said washers toward each other.

29. In a rocket engine having a combustion chamber and throat formed by a nozzle wall, that improvement which comprises:
  a. a multislotted nozzle wall, said wall being formed of a plurality of washers;
  b. said washers having a plurality of grooves formed on at least one face thereof whereby to form with an adjacent washer a plurality of passages;
  c. said washers further having a plurality of passage means therein aligned with passage means in adjacent washers whereby to form passages for passage of fluid in said washers, said grooves extending from the inner side of said nozzle wall to said passage means, grooves of one washer being offset relative to the grooves of an adjacent washer to evenly distribute said fluid around said nozzle wall;
  d. whereby fluid in said passages is adapted to pass through said grooves into said rocket engine to provide a cooling boundary layer.

* * * * *